Patented Aug. 27, 1946

2,406,410

UNITED STATES PATENT OFFICE 2,406,410

PRODUCTION OF ORGANIC SULPHIDES

Frank Kerr Signaigo, Wilmington, Del., assignor to E. I. du Pont de Nemours & Company, Wilmington, Del., a corporation of Delaware No Drawing. Application March 2, 1944, Serial No. 524,811

9 Claims. (Cl. 260—609)

This invention relates to the production of organic sulphides or thioethers, and more particularly to novel processes for producing such sulphides from carbonyl compounds.

Aliphatic thiols, aldehydes and ketones are useful intermediates for chemical syntheses. It has been discovered that organic sulphides can be readily synthesized in good yields from thiols and either aldehydes or ketones. Since sulphides are attractive as intermediates in the preparation of chemicals useful in the fields of insecticides, pharmaceuticals, rubber chemicals, surface-active agents, and the like, methods which make such materials available are of considerable practical importance.

This invention has as one of its primary objects the preparation of such sulphides by a new and improved method. Another object is to provide a simple and direct process for preparing aliphatic sulphides which are useful as such or as intermediates in the synthesis of important commercial products. Still another object is the preparation of sulphides from readily available raw carbonyl compound materials. Other objects will be apparent from a reading of the description which follows:

These and other objects are accomplished by the following invention which comprises catalytically hydrogenating an organic compound containing a carbonyl group in the presence of a thiol over a sulphactive hydrogenation catalyst.

In adapting the invention to practical application, a suitable organic carbonyl compound, such as an aldehyde or ketone, is charged into a conventional type of high pressure reactor together with hydrogen, an equivalent amount of a thiol, and a sulphactive hydrogenation catalyst prepared in accordance with the methods described in U. S. Patents Nos. 2,221,804 and 2,230,390. The reactor is then closed, agitated and heated to a temperature at which reaction occurs at a suitable, desired rate. Hydrogen is added or introduced as needed, to maintain the total pressure within the reaction vessel in the neighborhood of about 1,000 lbs./sq. in. After the reaction is complete, as evidenced by no further pressure decrease, the vessel is cooled, opened, the catalyst separated from the resulting product and the latter is then isolated and recovered by methods well known to the art.

Since the exact manner of practicing the invention will vary somewhat depending upon the particular compound processed, the invention is best illustrated by means of the following examples, wherein parts are by weight unless otherwise stated:

Example I

There is placed in a steel hydrogenation autoclave 70 parts of heptaldehyde, 56 parts of butanethiol-1, and 15 parts of a cobalt trisulphide catalyst prepared by precipitating a solution of cobalt chloride with sodium trisulphide. The washed precipitated $CoS_3$ is dried in an inert atmosphere since it is pyrophoric and made into a paste with dioxane. The autoclave is then charged with hydrogen at superatmospheric pressure and agitated and heated at 175° C. The initial total pressure in the autoclave at 175° is 2500 lbs./sq. in. During 3 hours, the pressure decreases to 2,000 lbs./sq. in. and no further pressure drop is observed during a second 3-hour heating period. The autoclave is cooled, the contents separated from the catalyst by filtration and subjected to vacuum distillation. The following products are obtained:

| Number | Amount, parts | Boiling point | Per cent sulphur | Per cent S (H) |
|---|---|---|---|---|
| 1 | 24 | 86° C./50 mm. to 77° C./27 mm. | 18.9 | 18.5 |
| 2 | 39 | 135° C./27 mm | 17.0 | 0 |
| 3 | 13 | 126° C./2.5 mm | 14.9 | 0.5 |

Product No. 1 appears to comprise a mixture of unreacted heptaldehyde and heptanethiol-1. The principal product, No. 2, comprises heptyl butyl sulphide. The high boiling by-product is probably diheptyl sulphide.

Example II

Into a high pressure hydrogenation autoclave there are charged 79 parts of dodecanethiol-1, 25 parts of acetone and 15 parts of cobalt trisulphide catalyst prepared as in Example I and 5 parts of acetic acid. As a diluent, 50 parts of dioxane are also added. The autoclave is charged with hydrogen at superatmospheric pressure and heated at 200° C. with agitation for 5 hours, at a total pressure of 2,000 lbs./sq. in. The contents of the autoclave are then cooled, filtered from the catalyst and vacuum distilled. There is recovered 43 parts of unreacted dodecanethiol which is followed by 13 parts of dodecyl-1 isopropyl sulphide boiling at 109° C. at 0.5 mm. This sulphide has the following analysis:

Found: C=74.4%; H=13.6%; S=12.2%, S(H)=0.6%.

Calculated for $C_{15}H_{32}S$: C=73.6%; H=13.2%; S=13.2%, S(H)=0

While the foregoing examples indicate that certain specific compounds may be readily converted to sulphides, in accordance with the invention, it will be obvious that my invention is not limited thereto.

In general catalytic hydrogenation of all aldehydes and ketones is contemplated as falling within the scope of this invention. Specific examples of such carbonyl compounds include aliphatic ketones, such as methyl ethyl ketone, diethyl ketone, methyl butyl ketone, diisopropyl ketone, etc.; alicyclic ketones such as cyclopentanone, cyclohexanone, menthone, camphor, etc.; aryl ketones such as acetophone, benzophone, etc., aliphatic aldehydes such as formaldehyde, acetaldehyde, butyraldehyde, heptaldehyde, 2-ethyl-hexanal, etc.; and aryl aldehydes such as benzaldehyde, paratoluic aldehyde, etc. As will be apparent, these carbonyl compounds may contain one or more carbonyl groups. Examples of compounds containing more than one carbonyl group are glyoxal, diacetyl, cyclohexanedione, benzoylacetone, 1,4-dibenzoylbutane, etc.; carbonyl compounds containing unreactive groups or linkages, such as hydroxy as in hydroxyaldehydes and ketones, such as glycol-aldehyde, sugars, etc.; amine as in amino ketones such as triacetoneamine and aminoacetophenone, etc.; nitro as in nitro aldehydes and ketones such as nitrobenzaldehyde, etc.; halogen as in chloroaldehydes and ketones such as chloroacetone, etc.; carboxyl and its salts, esters, and amides such as keto- and aldehydo-acids such as pyruvic acid, levulinic acid, ketostearic acid, acetoacetic ester, glyoxylic acid, and carboxy valeric aldehyde, etc.; unsaturated aldehydes and ketones such as crotonaldehyde, citronaldehyde, methyl vinyl ketone, phorone, acrolein, tiglic aldehyde, geranial and citronellal, etc.; alkoxy and aryloxy aldehydes and ketones such as methoxybenzaldehyde and ethoxyacetophenone, etc.; and compounds containing sulpho acid groups.

In the practice of this invention, any thiol can be used and specific examples include methanethiol, ethanethiol, propanethiol, hexanethiol, dodecanethiol, octadecanethiol, ethanedithiol, butanedithiol-1,4, hexanedithiol-1,6, decanedithiol-1,10, cyclohexanethiol, pinanethiol, thiophenol, thio-alpha-naphthol, thio-beta-naphthol, and thiosorbitol, etc. These may be used as such or formed in situ for use in the invention from compounds which readily yield them.

The amount of thiol component used should be at least the chemical equivalent of the carbonyl compound. To obtain an improved conversion of the carbonyl compound, it is desirable and preferable to use an amount of thiol which is in excess of the chemical equivalent of said carbonyl compound. In the case of $\alpha,\beta$-unsaturated carbonyl compounds, an additional mol of thiol may add to the ethylenic bond.

Although the above examples set forth certain definite conditions with respect to temperature, pressure, concentration, duration of reaction, catalyst, etc., it is to be understood that these values can be varied somewhat within the scope of this invention, since the conditions of each adaptation of the invention are determined by and depend upon the particular carbonyl compound treated, the quantity employed, the catalyst, and end product desired, etc.

In general the process of this invention is operative at temperatures ranging from 100° to 300° C. and at pressures ranging from atmospheric to a maximum determined by the practical limitations of the reaction vessel. It is preferred to operate at temperatures in the range of 150° to 225° C. and under a total pressure of from 100 to 5,000 lbs./sq. in. and particularly at pressures of from 500 to 2,000 lbs./sq. in. When the reactants involve aryl thiols or aryl carbonyl compounds it is desirable to operate at the minimum temperature at which reaction proceeds at a reasonable rate in order to minimize hydrocarbon formation.

Sulphactive catalysts utilizable in this invention comprise those which are active for the catalytic hydrogenation of sulphur in organic multisulphides, organic compounds having carbon to sulphur unsaturation, and organic sulphur compounds having sulphur to oxygen unsaturation. They may be prepared by precipitation methods or by sulphidation of the metals of their compounds at ordinary or at elevated temperatures by means of sulphur, hydrogen sulphide or other sulphur compounds and the latter may be done in situ. The activity of certain of the metal sulphide catalysts may be improved by treatment with hydrogen at elevated temperatures. More specific methods for preparing such catalysts comprise those disclosed in U. S. Patents Nos. 2,221,804 and 2,230,390. The type of sulphactive catalyst employed may be varied considerably. As a rule the subsulphides, sulphides and polysulphides of the common hydrogenating metals are effective. Especially useful are the sulphides and polysulphides of iron, nickel, cobalt, and molybdenum. The finely-divided metal or metal sulphide may be supported on suitable inert carriers such as kieselguhr, magnesia, alumina, etc. The proportion of catalyst employed may be varied considerably. In general, an amount that will bring about reaction at a suitable rate will be found within the range of 1 to 10% by weight of the combined reactants.

The process of this invention may be carried out as a batch, semicontinuous or continuous operation, in the absence of solvents, or in the presence of water or organic solvents such as ethanol, dioxane, or benzene. The presence of acids especially organic carboxylic acid will generally facilitate reaction of the less reactive types of ketones.

I claim as my invention:

1. A method for producing an organic sulphide which comprises hydrogenating an organic compound containing a carbonyl group in the presence of a thiol and a sulphactive hydrogenation catalyst.

2. A method for producing an organic sulphide which comprises hydrogenating at an elevated temperature and over a sulphactive hydrogenation catalyst an organic compound containing a carbonyl group and effecting said hydrogenation in the presence of an amount of a thiol at least chemically equivalent to the amount of carbonyl compound present.

3. A method for producing an organic sulphide which comprises hydrogenating an aldehyde at an elevated temperature in the presence of a thiol and a sulphactive hydrogenation catalyst.

4. A method for producing an organic sulphide which comprises hydrogenating a ketone at an elevated temperature in the presence of a thiol and a sulphactive hydrogenation catalyst.

5. A method for producing an organic sulphide which comprises hydrogenating ketonic acid at an elevated temperature in the presence of a thiol and a sulphactive hydrogenation catalyst.

6. A method for producing an organic sulphide which comprises hydrogenating an aliphatic aldehyde at an elevated temperature in the presence of a chemically equivalent amount of a thiol and a sulphactive hydrogenation catalyst, the amount of said catalyst ranging from about 1-10% by weight of the combined reactants.

7. A method for producing an organic sulphide which comprises hydrogenating an aliphatic ketone at an elevated temperature in the presence of a chemically equivalent amount of a thiol and a sulphactive hydrogenation catalyst, the amount of said catalyst ranging from about 1-10% by weight of the combined reactants.

8. A method for producing an organic sulphide which comprises hydrogenating at an elevated temperature heptaldehyde in the presence of at least a chemically equivalent amount of butanethiol-1 and from about 1-10% by weight, on the basis of the combined reactants, of a sulphactive hydrogenation catalyst.

9. A method for producing an organic sulphide which comprises hydrogenating at an elevated temperature acetone in the presence of at least a chemically equivalent amount of dodecanethiol-1 and from about 1-10% by weight, on the basis of the combined reactants, of a sulphactive hydrogenation catalyst.

FRANK KERR SIGNAIGO